United States Patent
Hiernaux

(10) Patent No.: US 10,132,188 B2
(45) Date of Patent: Nov. 20, 2018

(54) AXIAL TURBOMACHINE COMPRESSOR INNER SHELL

(71) Applicant: Techspace Aero S.A., Herstal (Milmort) (BE)

(72) Inventor: Stéphane Hiernaux, Oupeye (BE)

(73) Assignee: SAFRAN AERO BOOSTERS SA, Herstal (Milmort) (BE)

( * ) Notice: Subject to any disclaimer, the term of this patent is extended or adjusted under 35 U.S.C. 154(b) by 647 days.

(21) Appl. No.: 14/755,223

(22) Filed: Jun. 30, 2015

(65) Prior Publication Data

US 2015/0377058 A1    Dec. 31, 2015

(30) Foreign Application Priority Data

Jun. 30, 2014  (EP) .................................... 14174984

(51) Int. Cl.
*F01D 15/10*  (2006.01)
*F01D 5/14*  (2006.01)
(Continued)

(52) U.S. Cl.
CPC ............. *F01D 15/10* (2013.01); *F01D 5/145* (2013.01); *F01D 9/04* (2013.01); *F01D 9/041* (2013.01);
(Continued)

(58) Field of Classification Search
CPC ........... F05D 2270/172; F05D 2270/11; F05D 2270/17; F05D 2260/202; Y02T 50/166;
(Continued)

(56) References Cited

U.S. PATENT DOCUMENTS

| | | | |
|---|---|---|---|
| 8,235,072 B2 * | 8/2012 | Roy ...................... | B64C 23/005 137/825 |
| 2008/0145233 A1 * | 6/2008 | Lee ......................... | F01D 5/145 416/96 R |

(Continued)

FOREIGN PATENT DOCUMENTS

| EP | 1995171 A2 | 11/2008 |
|---|---|---|
| WO | 2008136697 A1 | 11/2008 |
| WO | 2008136698 A1 | 11/2008 |

OTHER PUBLICATIONS

Search Report dated Dec. 2, 2014 from European Patent Appl. No. 14174984.6.

*Primary Examiner* — Justin Seabe
*Assistant Examiner* — Joshua R Beebe
(74) *Attorney, Agent, or Firm* — James E. Walton

(57) ABSTRACT

The present application relates to an axial turbomachine gaseous flow-guiding element, such as a compressor inner shroud or vane. The element includes a plasma generator including: a layer of dielectric material with a guiding surface in contact with the gaseous flow, a first electrode placed in the guiding surface, and a second electrode electrically isolated from the first electrode by means of the dielectric layer. The plasma generator drives the gaseous flow along the guiding surface from the first electrode to the second electrode and includes a third electrode covered by the dielectric layer and electrically connected to the second electrode, so as to participate in the generation of the plasma in combination with the first electrode and the second electrode, the second electrode being closer to the guiding surface than the third electrode.

18 Claims, 3 Drawing Sheets

(51) Int. Cl.
*F02C 3/06* (2006.01)
*F01D 9/04* (2006.01)
*F01D 11/20* (2006.01)

(52) U.S. Cl.
CPC .............. *F01D 11/20* (2013.01); *F02C 3/06* (2013.01); *F05D 2270/172* (2013.01); *Y02T 50/672* (2013.01); *Y02T 50/673* (2013.01)

(58) Field of Classification Search
CPC ... Y02T 50/168; Y02T 50/672; Y02T 50/673; B64C 23/005; B64C 2230/12; H05H 2001/2412; H05H 2001/2418; H05H 2001/2425; H05H 2001/2437; H05H 1/24; F04D 29/687; F01D 5/145; F01D 5/186; F01D 11/20; F01D 9/04; F01D 9/041; F15D 1/0075; F02C 3/06
See application file for complete search history.

(56) References Cited

U.S. PATENT DOCUMENTS

| | | | |
|---|---|---|---|
| 2009/0169363 A1* | 7/2009 | Wadia | F04D 27/001 415/118 |
| 2009/0212164 A1* | 8/2009 | Osborne | B64C 23/005 244/205 |
| 2010/0040453 A1* | 2/2010 | Vo | F01D 11/20 415/1 |
| 2010/0122536 A1* | 5/2010 | Nolcheff | F23C 99/001 60/751 |
| 2010/0183424 A1* | 7/2010 | Roy | F01D 5/20 415/1 |
| 2011/0268556 A1* | 11/2011 | Montgomery | F01D 5/186 415/116 |
| 2013/0115103 A1* | 5/2013 | Dutta | F01D 5/186 416/97 R |
| 2013/0180245 A1* | 7/2013 | Saddoughi | F01D 9/041 60/697 |
| 2013/0291979 A1* | 11/2013 | Nordin | B64C 23/005 137/803 |

* cited by examiner

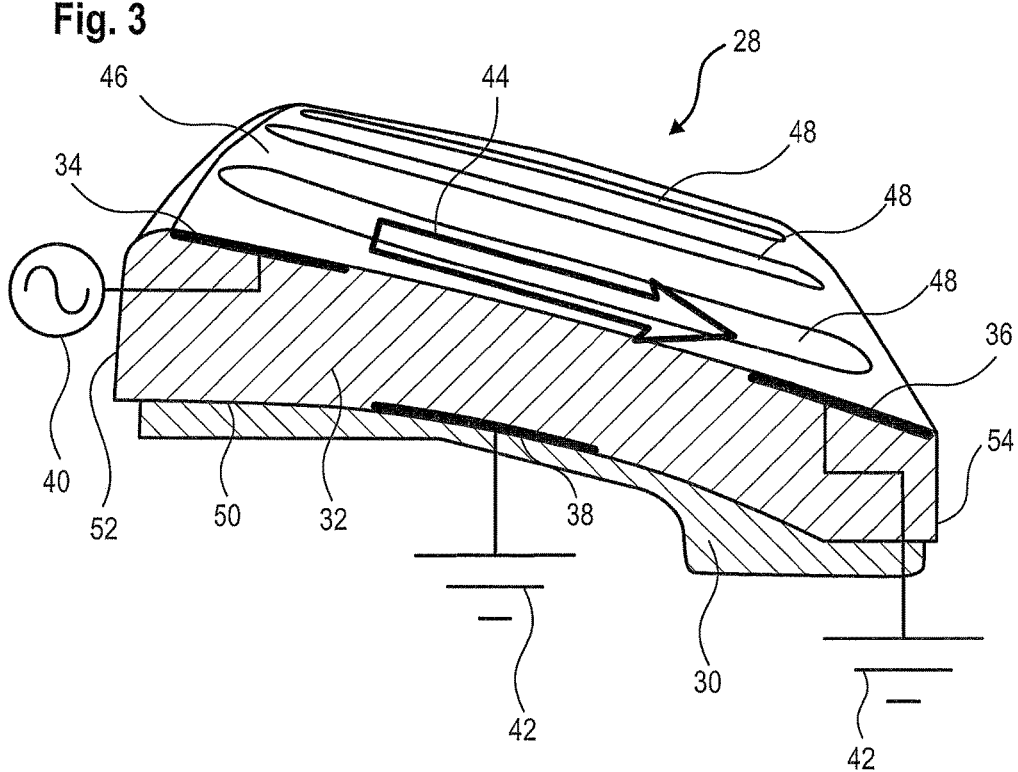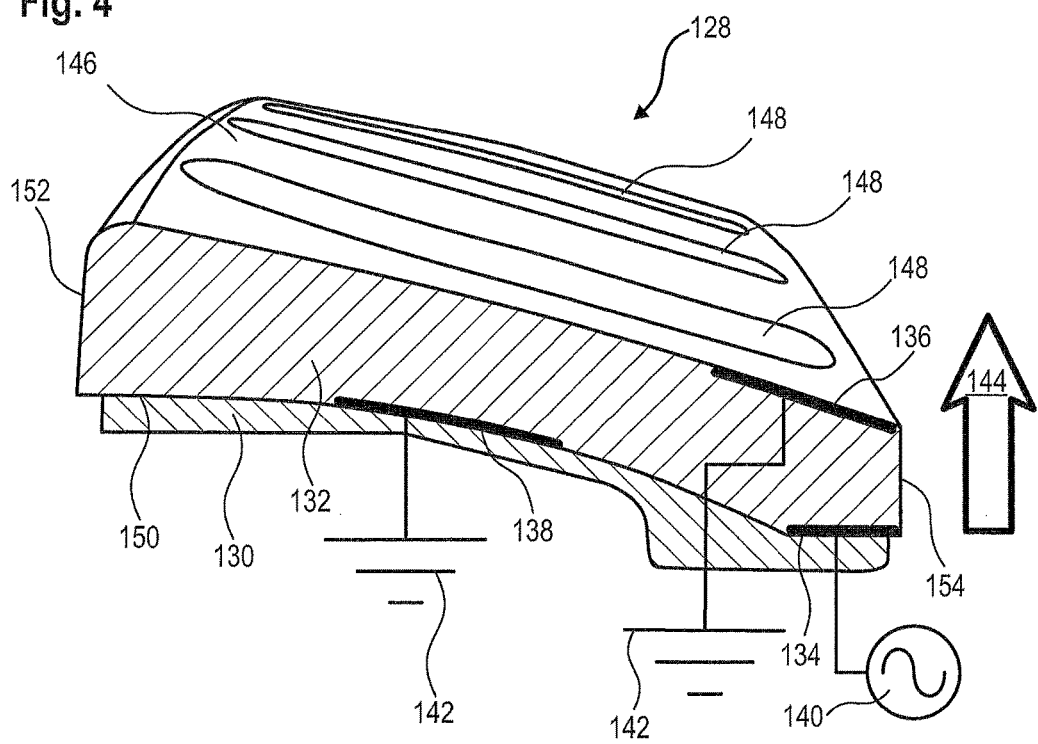

AXIAL TURBOMACHINE COMPRESSOR INNER SHELL

This application claims priority under 35 U.S.C. § 119 to European Patent Application No. 14174984.6, filed 30 Jun. 2014, titled "Axial Turbomachine Compressor Inner Shell," which is incorporated herein by reference for all purposes.

BACKGROUND

1. Field of the Application

The present application relates to the field of electric barrier discharge plasma generators for turbomachines. The present application more specifically relates to a turbomachine flow-guiding element comprising a plasma generator for driving a flow along a surface, possibly in order to avoid flow separations. The present application also relates to a turbomachine comprising an electric barrier discharge plasma generation system.

2. Description of Related Art

An aircraft turbojet engine generally comprises a fan, a compressor, a combustion chamber, and a turbine. In operation, the flows in the modules may encounter instabilities, such as surge phenomena. These instabilities limit the turbojet's possibilities, and can degrade performance.

In order to overcome these drawbacks, it is known to use an electrical discharge plasma generator with dielectric barrier that is integrated into a guiding surface of a casing. Such a generator can drive air near the casing, along its guiding surface.

Document US 2010/0040453 A1 discloses a turbomachine for an aircraft comprising an outer casing provided with a plasma generator. The plasma generator comprises a layer of dielectric material, a first electrode exposed to the flow of the turbomachine, and a second electrode surrounded by the dielectric layer so as to isolate the first electrode. The plasma generator is designed to drive air along the casing, and to increase the flow in the corresponding stream. The limits of the turbomachine are pushed back by controlling instabilities that may occur during operation. However, such a generator requires a significant amount of energy, and the amount of plasma created remains small. Managing instabilities thus requires an amount of energy that penalises the overall efficiency of the turbomachine. The plasma is heterogeneous.

Although great strides have been made in the area of flow-guiding elements in axial turbomachine compressors, many shortcomings remain.

DESCRIPTION OF THE DRAWINGS

FIG. 3 illustrates a guiding element, such an inner shroud, according to a first embodiment of the present application.

FIG. 4 illustrates a guiding element, such an inner shroud, according to a second embodiment of the present application.

DETAILED DESCRIPTION OF THE PREFERRED EMBODIMENT

Figure 1:
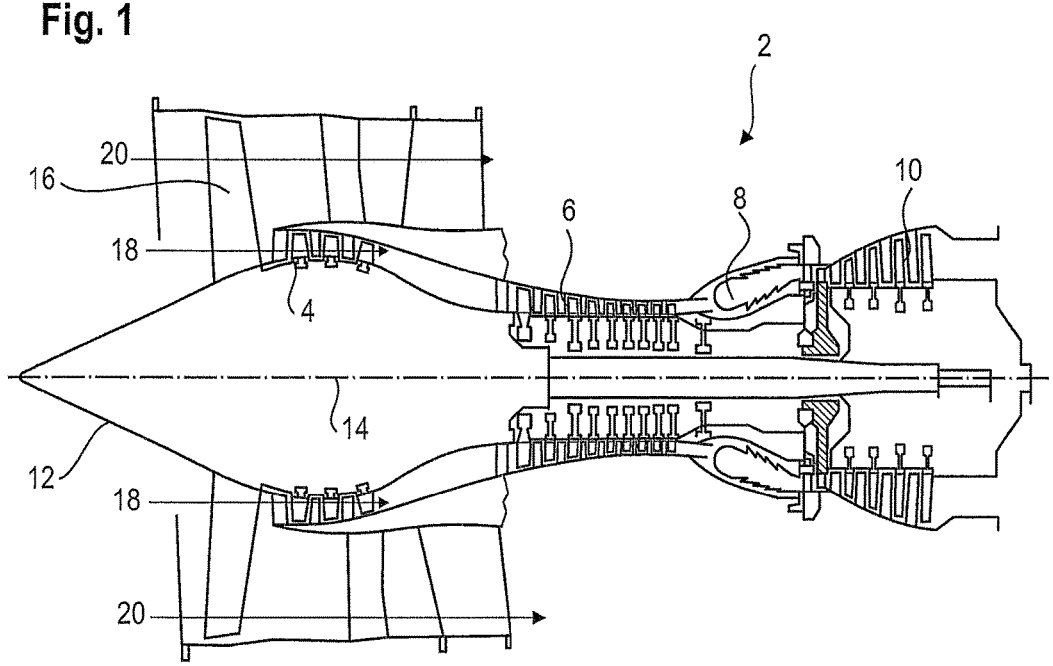
FIG. 1 represents an axial turbomachine according to the present application.

The present application aims to solve at least one of the problems of the prior art. More particularly, the present application aims to improve the overall efficiency of a turbomachine comprising a plasma generator. The present application also aims to improve the stability of a flow in a turbomachine comprising a flow-guiding element equipped with a plasma generator. The present application also aims to reduce the surge phenomena in a turbomachine comprising a flow-guiding element equipped with a plasma generator.

The present application relates to a turbomachine gaseous flow-guiding element, notably a compressor, the element comprising a plasma generator with a layer of dielectric material with a guiding surface in contact with the gaseous flow of the turbomachine, a first electrode placed in the guiding surface, a second electrode electrically isolated from the first electrode by means of the dielectric layer, the plasma generator being configured so as to drive the gaseous flow along the guiding surface from the first electrode to the second electrode, remarkable in that the plasma generator further comprises a third electrode covered by the dielectric layer and electrically connected to the second electrode so as to participate in the generation of the plasma in combination with the first electrode and the second electrode, the second electrode being closer to the guiding surface than the third electrode.

According to an advantageous embodiment of the present application, the dielectric layer comprises a surface opposite the guiding surface depending on the thickness of the dielectric layer, the third electrode being disposed on said opposite face, preferably the guiding surface and the opposite surface are main surfaces of the dielectric layer.

According to an advantageous embodiment of the present application, the third electrode is disposed between the second electrode and the first electrode in the direction of the gaseous stream, preferably the third electrode is disposed in the middle between the first electrode and the second electrode according to the direction of the gaseous stream.

According to an advantageous embodiment of the present application, the gaseous flow is an annular primary flow of the turbomachine, the first electrode being disposed upstream from the primary flow and the second electrode being disposed downstream from the primary flow, optionally the electrodes occupy the majority of the length of the element.

According to an advantageous embodiment of the present application, the second electrode and the third electrode are electrically isolated from the gaseous stream and/or the first electrode owing to the dielectric layer, preferably the second electrode is encased in the dielectric layer or covered with a dielectric coating.

According to an advantageous embodiment of the present application, the layer of dielectric material comprises fibres so as to form a composite material, optionally at least one or each electrode is in contact with glass fibres.

According to an advantageous embodiment of the present application, the second electrode and the third electrode are connected to an earth of the plasma generator, preferably the second electrode and the third electrode are electrically connected in parallel.

According to an advantageous embodiment of the present application, the element is a turbomachine shroud, the shroud comprises an upstream edge and a downstream edge, optionally the first electrode is disposed at the upstream edge and the second electrode is disposed at the downstream edge.

According to an advantageous embodiment of the present application, the shroud is formed of several segments separated by separating gaps, the first electrode and the second electrode being disposed on either side of one of the separating gaps, the third electrode crossing one of the separating gaps.

According to an advantageous embodiment of the present application, the shroud is an inner shroud and there guiding surface is an external guiding surface, the first electrode and the second electrode being disposed on the outer guiding surface of the shroud.

According to an advantageous embodiment of the present application, the shroud is an inner shroud which comprises an outer annular surface designed to guide an annular flow, and an inner annular surface, the first electrode and the second electrode being disposed at the downstream edge, the first electrode being on the side of the inner surface, and the second electrode being on the side of the outer surface of the shroud.

According to an advantageous embodiment of the present application, the element is a turbomachine vane, possibly a compressor stator vane, the vane comprising a leading edge, a trailing edge, a pressure face and a suction face extending from the leading edge to the trailing edge, the first electrode and the second electrode are disposed on the suction face of the vane and the third electrode is disposed on the pressure face of the vane.

According to an advantageous embodiment of the present application, the middle of the chord of the vane is disposed at the first electrode.

According to an advantageous embodiment of the present application, the second electrode forms the trailing edge, preferentially the vane comprises a metal leading edge that is electrically isolated from the electrodes by means of a dielectric layer.

According to an advantageous embodiment of the present application, the first electrode and the second electrode are offset relative to each other along the entire length of the strip.

According to an advantageous embodiment of the present application, the dielectric layer may comprise a stack of several layers of dielectric material.

According to an advantageous embodiment of the present application, the electrodes are connected to a voltage generator.

According to an advantageous embodiment of the present application, the voltage generator is connected to earth.

According to an advantageous embodiment of the present application, the electrodes are generally parallel.

According to an advantageous embodiment of the present application, the first electrode and the second electrode are integrated in the thickness of the element and flush with its outer surface.

According to an advantageous embodiment of the present application, the electrodes are integrated in the thickness of the layer of dielectric material.

According to an advantageous embodiment of the present application, the first electrode is generally planar and in contact with the gaseous stream, the second electrode and the third electrode being offset relative to the general plane of the first electrode.

According to an advantageous embodiment of the present application, the shroud is a shroud for an axial turbomachine, the axial centre of the shroud being at the axial level of the third electrode.

According to an advantageous embodiment of the present application, the plasma generator comprises a conductive member connecting the second electrode to the third electrode.

The present application also relates to a turbomachine comprising at least one gaseous flow-guiding element, characterised in that the element is in compliance with the present application, preferably the turbomachine comprises a device for supplying power to each first element, and/or a battery to supply power to each first element, the battery being optionally connected to the power supply device of the turbomachine.

According to an advantageous embodiment of the present application, at least one of the electrodes radially faces the rotor.

According to an advantageous embodiment of the present application, the driving plasma drives the flow toward the rotation axis of the compressor or of the turbomachine.

According to an advantageous embodiment of the present application, the turbomachine is a turbo reactor, preferably of a plane.

The electrodes also allow the guiding element to be mechanically reinforced. The plasma is more homogeneous. It is obtained with less energy and further accelerates the stream. The margin of stability of the turbomachine is increased, and secondary losses are limited.

As described herein, the terms internal or interior and external or exterior refer to a position in relation to the axis of rotation of an axial turbomachine.

FIG. 1 schematically shows an axial turbomachine. In this case, it is a double-flow turbojet engine. The turbojet engine 2 comprises a first compression level, designated low-pressure compressor 4, a second compression level, designated high pressure compressor 6, a combustion chamber 8 and one or more turbine levels 10. In operation, the mechanical power transmitted to the turbine 10 via the central shaft to the rotor 12 moves the two compressors 4 and 6. Each of the various turbine levels can be connected to the compressor stages via concentric shafts. The latter comprise several rows of rotor blades associated with rows of stator vanes. The rotation of the rotor about its axis of rotation 14 thus generates a flow of air and gradually compresses the latter up to the inlet of the combustion chamber 8.

An intake fan 16 is coupled to the rotor 12 and generates an air flow which is divided into a primary flow 18 passing through the various abovementioned levels of the turbomachine, and a secondary flow 20 passing through an annular conduit (shown in part) along the machine that then joins the primary flow at the turbine outlet. The secondary flow can be accelerated so as to generate a reaction. The primary flow 18 and secondary flow 20 are annular flows; they are guided by the casing of the turbomachine. For this purpose, the casing has cylindrical walls or shrouds which may be internal and external to guide the interior or exterior of an annular flow.

Figure 2:
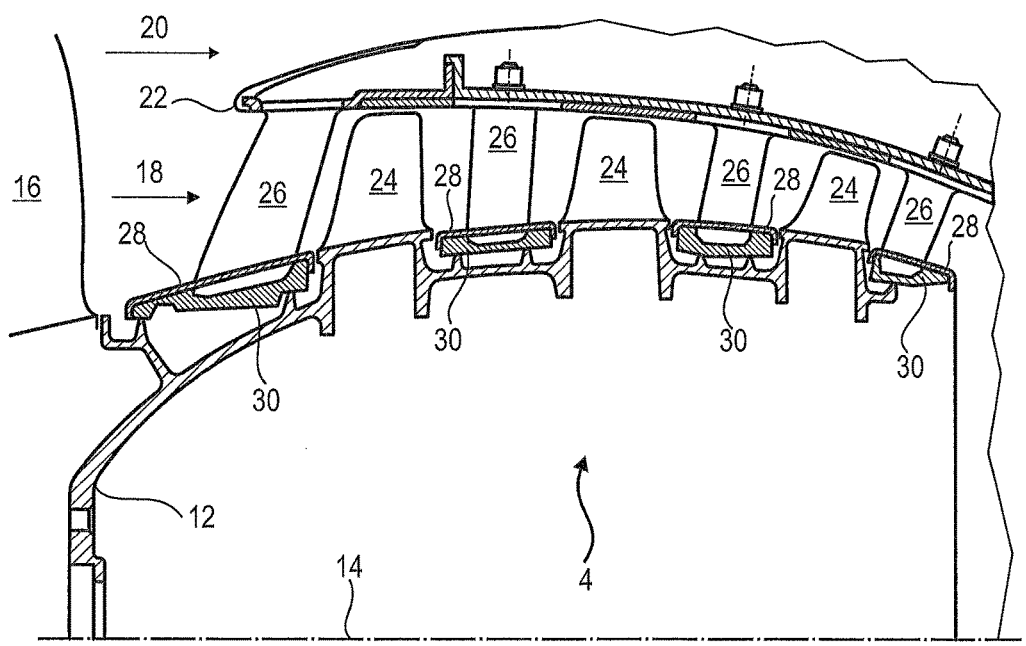
FIG. 2 is a diagram of a turbomachine compressor according to the present application.

FIG. 2 is a sectional view of a compressor of an axial turbomachine 2 such as that of FIG. 1. The compressor may be a low-pressure compressor 4. One can observe a portion of the fan 16 and the separator nose 22 of the primary flow 18 and the secondary flow 20. The rotor 12 comprises several rows of rotor blades 24, in this case three.

The low-pressure compressor 4 comprises a plurality of rectifiers, in this case four, each of which contain a row of stator vanes 26. The rectifiers are associated with the fan 16 or a row of rotor blades for rectifying the airflow, so as to convert the flow velocity into pressure.

The stator vanes 26 extend substantially radially from an exterior casing, and can be secured by means of a pin. The stator vanes are evenly spaced, and have the same angular orientation in the flow. Advantageously, the vanes of the same row are identical. Optionally, the spacing between the vanes can vary locally as well as their angular orientation.

Some vanes may be different from the rest of the vanes of their row, for example by the presence or configuration of plasma generators.

The inner ends of the stator vanes 26 can support an inner shroud 28. Each inner shroud 28 is circular in shape, and can be segmented. At least one or each inner shroud may be formed of angular segments. At least one or each inner shroud 28 can be used to mechanically connect several stator vanes 26 of the same row. Each inner shroud can be used to guide and/or to define the primary flow 18.

At least one or each inner shroud 28 may comprise a sealing layer, such as an abradable layer 30 or brittle layer. Each abradable layer 30 can be designed to cooperate with rubbing fins, or annular ribs formed on the external surface of the rotor 12 to ensure sealing. Each abradable layer 30 may be silicone-based. The combination of brush seals and an abradable layer limits the recirculation of fluid that is reinjected upstream from the inner shroud passing along the rotor 12.

FIG. 3 shows a flow-guiding element, such as a turbomachine shroud 28, possibly internal. The shroud 28 may be that of a low-pressure compressor, for example, such as that shown in FIG. 2. The shroud may be a high-pressure compressor shroud, or a turbine shroud.

The shroud 28 or each shroud may comprise at least one plasma generator, which may comprise a layer of dielectric material 32, a first electrode 34, a second electrode 36, a third electrode 38, and a voltage generator 40 connected to at least one of the electrodes. The plasma generator may include an earth 42. A voltage generator may be common to a plurality of plasma generators which are disposed at various locations on the shroud, and/or a plurality of shrouds, and/or at several locations on the turbomachine. The, or each, plasma generator is configured to ionize a part of the gas, and to drive the ions formed by means of an electric field. The entrained ions in turn drive part of the gaseous flow 44 along the guiding surface 46 from upstream to downstream.

The dielectric layer 32 may have an annular shape, and optionally form an annular body. It may form the majority of the radial thickness of the inner shroud 28 and/or the entire axial length of the shroud 28. It can mechanically interconnect several stator vanes. It can comprise several cavities 48 or pockets 48 in which the vane ends are secured.

The dielectric layer 32 can be a material that electrically isolates the electrodes (34; 36; 38) from one other. This layer may include glass, polymeric materials such as the epoxy resin, polypropylene, polyethylene, Teflon or a combination of these materials. It may be a composite material, with a fibre-reinforced resin. The resin can be a polymer material such as those mentioned above; the fibres can be glass. The dielectric layer 32 can include a guiding surface 46 of the gaseous flux flowing through the turbomachine, and it may be the outer surface of the shroud 28 which defines the inside of the primary flow. The dielectric layer 32 may be formed of several layers of dielectric material. The dielectric layer 32 may include, according to its radial thickness, a surface 50 opposite the guiding surface 46. Said surfaces may be major surfaces, which are so considered by their sizes.

At least one or each electrode (34; 36; 38) may be circular and extend around the periphery of the shroud 28. They may be metallic. Alternately, at least one, or some, or all the electrodes (34; 36; 38) can be segmented, in order to be placed, for example, between the stator vanes, by being distributed around the shroud 28. According to the revolution profile of the shroud, the electrodes (34; 36; 38) can be generally parallel to each other. The first 34, the second 36 and the third electrodes 38 can be offset axially and/or radially from one another. In combination, they can extend over the axial majority of the shroud 28.

The first electrode 34 may be disposed upstream from the inner shroud 28. It can be disposed in the upstream half of the shroud, optionally at the upstream edge 52. Optionally, it is directly connected to the voltage generator 40. It can be placed in the guiding surface 46; i.e., it can be surrounded by the guiding surface 46, and/or to be incorporated in it by forming surface continuity. The surface of the first electrode 34 may be in contact with the primary flow of the turbomachine. Said surface may be flush with the guiding surface.

The second electrode 36 is electrically isolated from the first electrode owing to the dielectric layer 32. Electrical isolation can be understood as a physical separation still enabling the creation of a plasma. The second electrode 36 can be encased by the dielectric layer 32. It can be set back from the guiding surface 46. It can be covered on one face by the dielectric layer 32 and be coated with an insulator on the other face, for example with dielectric material. It can be connected to the voltage generator 40 on the terminal opposite that on which the first electrode 34 is connected. It can be connected to the earth 42. The second electrode 36 is disposed downstream from the first electrode 34, for example in the downstream half of the shroud 28, optionally axially from the downstream edge 54 of the shroud.

The third electrode 38 is covered by the dielectric layer 32 so as to be electrically isolated from the first electrode 34 and from the second electrode 36. It can be disposed on the opposite surface 50 of the dielectric layer. It can be further away from the guiding surface than is the second electrode 36. It is disposed axially between the first electrode 34 and the second electrode 36. The third electrode 38 may be connected to the second electrode 36, possibly directly through a conductive member, or via the common earth 42 of the electrical circuit of the plasma generator. It can be connected to the voltage generator 40 and/or to the earth 42 in the same manner as the second electrode 36.

The abradable layer 30 can cover the third electrode 38, and optionally encapsulate it in combination with the dielectric layer 32. The dielectric layer 32 may form an electrical barrier between the first electrode 34 on the one hand, and the second and third electrodes.

With the arrangement described above, the electrodes (34; 36; 38) make it possible to generate a plasma in combination.

FIG. 4 illustrates a guiding element 128 according to a second embodiment of the present application. This FIG. 4 reflects the numbering of the previous figures for identical or similar elements, although the numbering is incremented from 100. Specific numbers are used for elements specific to this embodiment.

The shroud 128 essentially differs from the first embodiment in that the first electrode 134 is disposed at the downstream edge 154 of the shroud, on the inner surface of the dielectric layer 132. One of the faces of the first electrode 134 may be covered, possibly for the most part, by the abradable layer 130. The guiding surface 146 is thus the downstream surface of the shroud. A portion of the first electrode 134 may be defined by the abradable layer 130 and the dielectric layer 132. This plasma generator architecture allows it to resist flow recirculations under the shroud. The plasma generator can then be configured so as to generate a gas flow 144 circulating radially outwardly.

Figure 5:
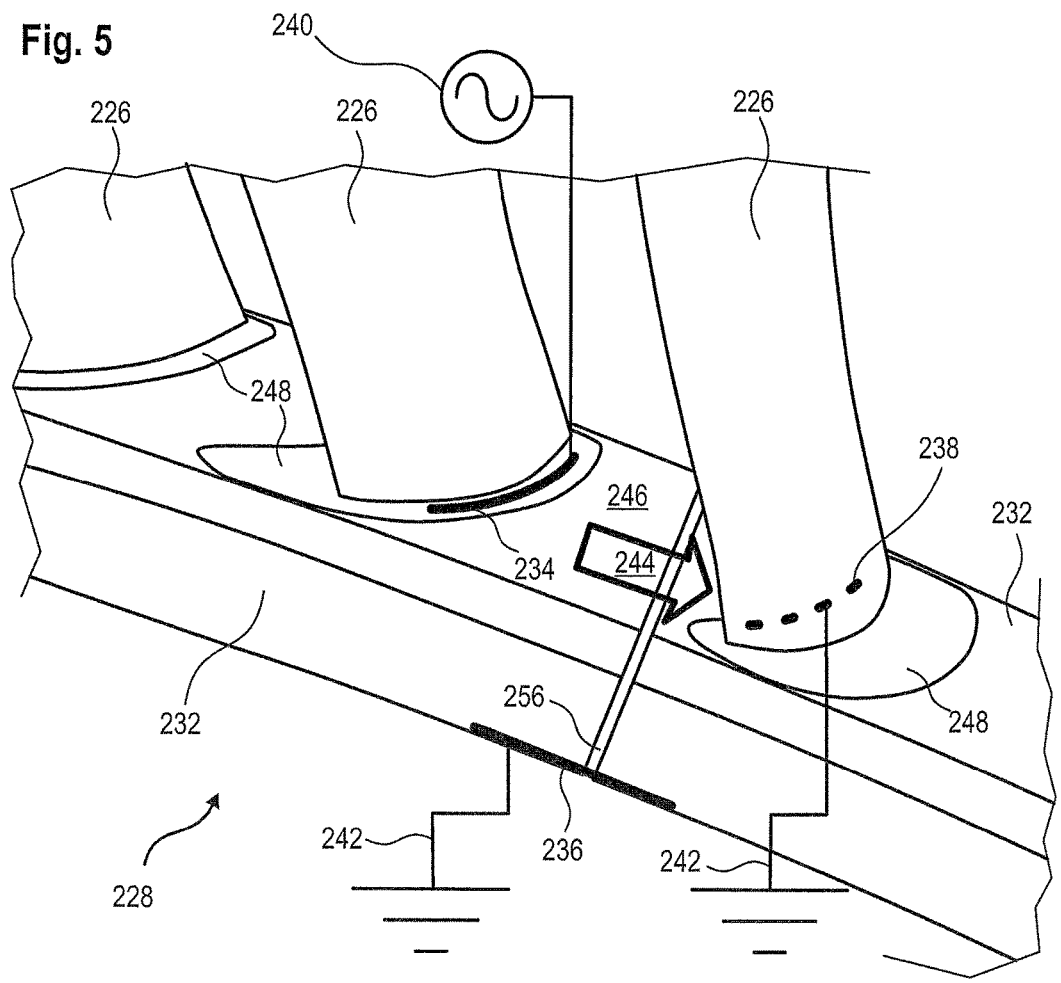
FIG. 5 illustrates a guiding element, such an inner shroud, according to a third embodiment of the present application.

FIG. 5 illustrates a guiding element according to a third embodiment of the present application. This FIG. 5 reflects the numbering of the previous figures for identical or similar elements, although the numbering is incremented from 200. Specific numbers are used for elements specific to this embodiment.

The shroud 226 can be segmented. It may have open gaps 256 that form angular separations between the segments. It can also have pockets 248 or apertures for introducing and securing the ends of vanes 226.

The third electrode 238 is disposed across a gap 256 between neighboring shroud segments. It may extend onto the two shroud segments 228 on either side of the gap 256. The first electrode 234 is disposed on one side of the gap 256, and the second electrode 236 is disposed on the other side of the gap 256, the first electrode 234 and second electrode 236 being arranged on the same radial face of the shroud 228, for example on the outer surface. At least one electrode, for example the first electrode 234, can be arranged in the vane root, for example in a vane mounting pocket 248.

This configuration generates plasma that can span a separating gap 256. This plasma can result in a flow 246 or stream along the outer surface of the shroud, depending on its circumference, preventing the stream from being engulfed in the gap.

Figure 6:
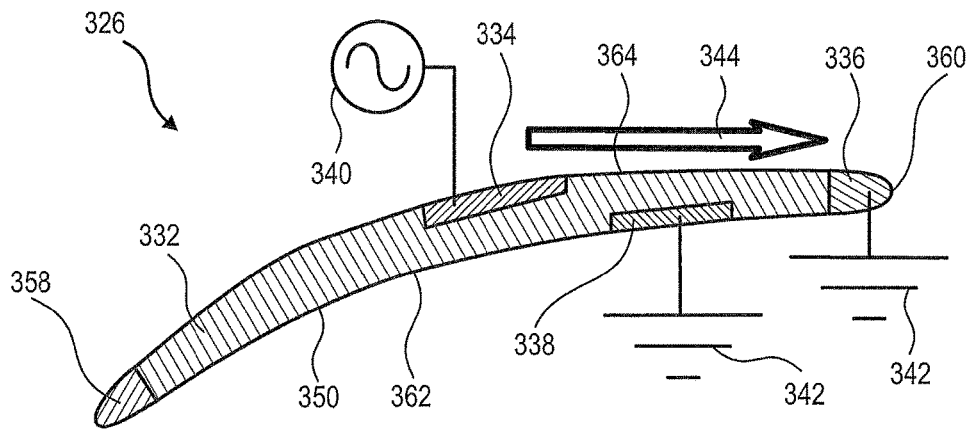
FIG. 6 illustrates a guiding element, such a vane, according to a fourth embodiment of the present application.

FIG. 6 illustrates a guiding element according to a fourth embodiment of the present application. This FIG. 6 reflects the numbering of the previous figures for identical or similar elements, although the numbering is incremented from 300. Specific numbers are used for elements specific to this embodiment.

The guide element is a vane 326, such as a stator vane. It is obvious to those skilled in the art that the present application can equally be applied to a rotor blade or to a fan blade. The vane 326 comprises a vane adapted to extend into the flow of the turbomachine, the vane having a leading edge 358, a trailing edge 360, a pressure face 362 and a suction face 364, said surfaces extending from the leading edge 358 to the trailing edge 360. The vane is mainly formed by the layer of dielectric material 332. The dielectric material 332 is advantageously a composite material so as to optimise the mechanical strength. The dielectric layer shows a half pressure face and a half suction face.

The vane of the vane 326 has a curved airfoil and a chord. The first electrode 334 is disposed on the suction face 364, for example in the middle of the chord of vane 326, or in the middle, axially, of the vane. The trailing edge 360 may be formed by the second electrode 336 which is separated and/or electrically isolated from the first electrode 334 by the dielectric layer 334. The third electrode 338 is disposed on the surface 350 opposite to the suction face 364, i.e. on the pressure face 362. The first electrode 334 may be housed in the thickness of the suction face half, and the third electrode 338 may be housed in the thickness of the pressure face half. Optionally, the second electrode has a thickness substantially equal to the thickness of the downstream part of the dielectric layer 332. The third electrode 338 may then further from the suction face 364 than the second electrode 336. It can be disposed axially between the first and the second electrode, optionally in the middle.

Each of the electrodes (334; 336; 338) can extend over the majority of the radial height of the vane of the vane 326, optionally over its entire radial height. The vane 326 may comprise a metal leading edge 358 which could be an electrode. This leading edge can be isolated from other electrodes by means of a dielectric layer 332. In this configuration, the vane is completely formed by the plasma generator, except possibly its leading edge.

With the present configuration, the plasma generator is used to drive the flow 344 along the suction face 364 of the vane 326. More flow 344 thus follows the airfoil of the vane. The latter becomes more efficient in guiding and/or deflecting, and/or accelerating the flow.

All embodiments of the present application can be combined on the same rectifier, on the same shroud, on a turbomachine. The description above deals with a trio of electrodes forming a plasma generator. The scope of the present application also relates to vanes, shrouds, and turbomachines each having one or more electrodes trios, each forming a plasma generator. One or each or several trios of electrodes are in accordance with the description above.

I claim:

1. A guiding element of a gaseous flow of a turbomachine, comprising:
    a plasma generator;
    a guiding surface of the gaseous flow of the turbomachine;
    a layer of dielectric material in contact with the gaseous flow of the turbomachine and partially forming the guiding surface;
    a first electrode placed in the guiding surface;
    a second electrode electrically isolated from the first electrode by the dielectric layer, the plasma generator being configured so as to drive the gaseous flow along the guiding surface from the first electrode towards the second electrode by a driving plasma; and
    a third electrode electrically connected to the second electrode so as to participate in the generation of the driving plasma in combination with the first electrode and the second electrode;
    wherein the third electrode is covered by the dielectric layer and the second electrode is closer to the guiding surface than the third electrode, and the first electrode and the second electrode partially forming the guiding surface and being biased at different electric potentials.

2. The guiding element in accordance with claim 1, wherein the dielectric layer comprises:
    a surface opposite the guiding surface with respect to the thickness of the dielectric layer, the third electrode being disposed on the opposite surface.

3. The guiding element in accordance with claim 1, wherein the third electrode is disposed between the second electrode and the first electrode in the flow direction of the gaseous flow.

4. The guiding element in accordance with claim 1, wherein the gaseous flow is a primary annular flow of the turbomachine, the first electrode being disposed upstream from the primary flow and the second electrode being disposed downstream from the primary flow.

5. The guiding element in accordance with claim 1, wherein the second electrode and the third electrode are electrically isolated from the gas flow and from the first electrode by the dielectric layer.

6. The guiding element in accordance with claim 1, wherein the second electrode is encased in the dielectric layer.

7. The guiding element in accordance with claim 1, wherein the layer of dielectric material comprises:
    fibres so as to form a composite material.

8. The guiding element in accordance with claim 1, wherein the second electrode and the third electrode are connected together by a conducting element and to the earth potential of the plasma generator, the conducting element being a wire.

9. The guiding element in accordance with claim 1, being configured to define an inner shroud comprising:
   outer annular surface for guiding an annular flow; and
   an inner annular surface;
   wherein the first electrode and the second electrode are disposed at the downstream edge, the first electrode being in the inner surface, and the second electrode being in the outer surface of the shroud.

10. The guiding element in accordance with claim 1, being configured to define a turbomachine vane, wherein the driving plasma drives the flow in a circumferential direction toward the vane.

11. An axial turbomachine compressor for compressing an annular flow flowing axially therethrough, comprising:
   a rotor with several rows of blades and a stator with several rows of vanes embracing the blade rows, the stator comprising:
   a plasma generator; and
   at least one of the vanes exhibiting a guiding surface of the annular flow said guiding surface comprising a leading edge, a trailing edge, a pressure face, and a suction face which extend from the leading edge to the trailing edge, the plasma generator comprising:
   a layer of dielectric material partially forming the guiding surface in order to guide the compressed annular flow;
   a first electrode placed in the guiding surface and partially forming the guiding surface;
   a second electrode electrically isolated from the first electrode by the dielectric layer, the plasma generator being configured so as to drive the annular flow along the guiding surface from the first electrode towards the second electrode by means of a driving plasma; and
   a third electrode which is electrically connected to the second electrode so as to participate in the generation of the driving plasma in combination with the first electrode and the second electrode;
   wherein the third electrode is covered by the dielectric layer and the second electrode is closer to the guiding surface than the third electrode, wherein the first electrode and the second electrode being arranged on the suction face of the vane and the third electrode being disposed on the pressure side of the vane.

12. The axial turbomachine compressor in accordance with claim 11, wherein the middle of the chord of the vane is disposed at the first electrode.

13. The axial turbomachine compressor in accordance with claim 11, wherein the second electrode forms the trailing edge of the vane, and the vane comprises:
   a metal leading edge which is electrically isolated from the first electrode, the second electrode and the third electrode by the dielectric layer.

14. An axial turbomachine exhibiting a primary annular flow and a secondary annular flow around the primary annular flow, the turbomachine comprising:
   at least one shroud with a guiding surface of the primary flow and which is formed of several segments separated by separating gaps; and
   a plasma generator comprising:
   a layer of dielectric material in contact with the primary flow of the turbomachine and partially forming the guiding surface;
   a first electrode placed in the guiding surface and partially forming the guiding surface;
   a second electrode electrically isolated from the first electrode by the dielectric layer, the plasma generator being configured so as to drive the annular flow along the guiding surface from the first electrode towards the second electrode by a driving plasma; and
   a third electrode which is electrically connected to the second electrode so as to participate in the generation of the driving plasma in combination with the first electrode and the second electrode, the driving plasma crossing over the third electrode;
   wherein the third electrode is isolated of the primary flow by the dielectric layer and the second electrode is closer to the guiding surface than the third electrode, and the first electrode and the second electrode being disposed on either side of one of the separating gaps, the third electrode passing through one of the separating gaps.

15. The axial turbomachine in accordance with claim 14, further comprising: a power supply device for supplying power to the first electrode in order to generate the driving plasma.

16. The axial turbomachine in accordance with claim 14, wherein the shroud includes an upstream edge and a downstream edge, the first electrode being disposed at the upstream edge and the second electrode being disposed at the downstream edge.

17. The axial turbomachine in accordance with claim 14, wherein the guiding surface is an outer guiding surface, the first electrode and the second electrode are disposed on the outer guiding surface of the shroud.

18. The axial turbomachine in accordance with claim 14, wherein at least one of the first electrode, the second electrode and the third electrode is axially facing the rotor.

* * * * *